Patented July 10, 1951

2,559,891

UNITED STATES PATENT OFFICE 2,559,891

PRODUCTION OF UREA-FORMALDEHYDE HARDENED FOAM

Leonard S. Meyer, Newark, Ohio, assignor to Libbey-Owens-Ford Glass Company, Toledo, Ohio, a corporation of Ohio No Drawing. Application December 13, 1947, Serial No. 791,667

7 Claims. (Cl. 260—2.5)

The invention relates to the production of hardened urea-formaldehyde resin foam of improved compressive strength.

A urea-formaldehyde resin foam may be produced in the customary manner by foaming an aqueous urea-formaldehyde condensation product solution having an acid pH, and then allowing the resulting foam to harden. A urea-formaldehyde resin foam is an excellent insulating material. Because of its extremely light weight, it can be used to fill dead air spaces without materially adding to the weight of the structure. The filling of dead air spaces provides insulation by preventing convection currents, and is particularly valuable in aircraft because explosive mixtures are likely to form in such air spaces in case of leakage of fuel tanks.

Unfortunately, however, urea-formaldehyde resin foam is relatively fragile because its compressive strength is low. Its fragility tends to cause it to break into small fragments when handled, and such breakage is wasteful because the foam is required to be in the form of integral blocks for most uses.

Urea and formaldehyde combine with one another by a condensation reaction, and the condensation reaction is a progressive one that may be advanced more and more to produce a more insoluble condensation product. An aqueous solution of a urea-formaldehyde condensation product behaves like a solution of water in the condensation product, because only a limited amount of water can be added without causing precipitation: the more advanced the condensation, the more limited the amount of water that can be added to the condensation product without causing precipitation.

It has now been found that increasing the degree of condensation of a urea-formaldehyde condensation product tends to increase the compressive strength of a hardened foam produced from the condensation product. However, it has not been possible to produce a hardened foam of increased compressive strength by using a urea-formaldehyde product condensed to an increased degree. When a urea-formaldehyde product condensed to an increased degree is employed in a hardened foam producing process in the usual manner (i. e., together with a foaming agent and a hardening catalyst so as to provide an acid pH) in an aqueous solution that is whipped to produce a foam, the degree of condensation of the urea-formaldehyde product, of course, advances still further as the foam begins to harden under the action of the hardening catalyst. Such further advancement of the condensation causes separation of the water from the urea-formaldehyde product so that the foam collapses.

Thus although it has been found that the compressive strength of the hardened foam increases as the degree of condensation of the urea-formaldehyde product used in making the foam is increased up to a certain point, the desired improvement in the compressive strength of the hardened foam cannot be obtained because a hardened foam cannot be produced if the degree of advancement of the condensation is increased beyond such point.

The principal object of the invention is the production of hardened urea-formaldehyde resin foam having improved compressive strength. More specific objects and advantages are apparent from the description which merely discloses and illustrates the invention and is not intended to impose limitations upon the claims.

It has been well known for several years that the presence of free urea in a urea-formaldehyde condensation product causes the water resistance of the material to be low after the urea-formaldehyde condensation product containing the free urea has been hardened. The free urea may react with the urea-formaldehyde condensation product during the hardening operation, but in so reacting it reduces the degree of advancement of the condensation so that it is difficult to harden the condensation product completely. The resulting incomplete hardening of the condensation product tends to impair the water resistance and other qualities of the product.

In addition to its effect of reducing the degree to which the condensation of the urea-formaldehyde product may be advanced during the hardening operation, the addition of free urea to the condensation product prior to the hardening operation lowers the ratio of formaldehyde to urea in the product. It is well known that a lower formaldehyde urea ratio causes precipitation to occur more readily upon addition of water to a urea-formaldehyde condensation product.

Thus in a hardened foam producing process the addition of free urea to an aqueous solution containing a urea-formaldehyde condensation product prior to the foaming of the solution at an acid pH would be expected to reduce the degree of advancement of the condensation of the urea-formaldehyde product and thereby reduce the compressive strength of the resulting hardened foam, and also would be expected to cause the urea-formaldehyde product to precipitate more readily at a given degree of condensation.

The present invention is based upon the discovery that on the contrary the addition of free urea to such a solution increases the compressive strength of the hardened foam produced from the solution.

The present invention is based upon the discovery that in carrying out a hardened foam producing process, characterized by foaming an aqueous solution having an acid pH and containing a urea-formaldehyde condensation product, the incorporation of free urea in the solution after formation of the condensation product brings about a substantial increase in the compressive strength of the resulting hardened foam. The substantial increase in compressive strength produced by the present method greatly increases the usefulness of the hardened foam because it makes it possible to use the foam as a construction material without prohibitive losses by breakage and disintegration.

The inventive step of incorporating free urea in the solution, after formation of the condensation product, is used in a hardened foam producing process which is characterized by foaming an aqueous solution having an acid pH and containing a urea-formaldehyde condensation product. In other words, the foaming process to which the inventive step is applicable is a process in which the aqueous solution is foamed while it is maintained at the customary acid pH (i. e., a pH ranging from about 1 to about 5), and the conditions prevailing and the ingredients used (other than the free urea) in carrying out the process of the invention are those used customarily in the art for such a process. For example, the hardening agent used imparts the customary acid pH to the solution; the foaming agent is operable in a solution having an acid pH and does not inhibit the functioning of the hardening agent; and the concentration of urea-formaldehyde condensation product in the aqueous solution is such that the solution may be foamed by the usual agitation or whipping operation.

The starting material in the production of a hardened foam in accordance with the present invention is a solution of a urea-formaldehyde condensation product, preferably in water. The concentration of the solution should be such as to produce a foam of the desired specific gravity in the whipping apparatus employed, and may range from as high as about 45 per cent to as low as about 10–15 per cent which gives as dilute a solution as is practicable for foaming processes. If the solution is too concentrated, it may be so viscous that it cannot be whipped into a foam having a specific gravity as low as desired. If a filler is employed, the concentration of the urea-formaldehyde condensation product in the solution must be less and the proportion of fibrous filler should also be limited so that the viscosity of the composition is not excessive.

A urea-formaldehyde resin foam can be produced with a specific gravity from about .01 to about .04. The lower the specific gravity, the more fragile is the foam. On the other hand, if the solution is whipped to a lesser extent, so as to produce a foam of greater specific gravity, the resulting foam may have a tendency to crack or disintegrate upon drying out. If a finely divided cellulose filler, such as fine wood flour, is incorporated in the solution to be foamed, it is possible to produce a foam having a specific gravity as high as .05 that does not disintegrate seriously upon drying.

In the practice of the present invention, the proportion of free urea incorporated in the solution containing the urea-formaldehyde condensation product prior to foaming may be varied widely. Any material proportion (i. e., about 5 per cent of the weight of the condensation product or more) of free urea may be employed to produce an appreciable improvement in the compressive strength of the hardened foam. The maximum permissible proportion of free urea is different under various conditions, but in any event free urea should not be used in unreasonably large amounts (e. g., over about 60 per cent of the weight of the condensation product). In general it is not desirable to add an amount of free urea great enough to reduce the overall molal formaldehyde-urea ratio to less than about 1:1. In other words, the sum of the weight of free urea incorporated in a given solution and the weight of urea used in making the urea-formaldehyde condensation product contained in the solution should not be more than about twice the weight of formaldehyde used in making the urea-formaldehyde condensation product.

Between the time when the free urea is incorporated in the solution of the urea-formaldehyde condensation product and the time when the solution is foamed, reaction between the free urea and the urea-formaldehyde condensation product should not be permitted to proceed to such an extent that no actual free urea remains in the solution. Preferably, urea is added to a solution of the urea-formaldehyde condensation product just before foaming is carried out.

The amount of foaming agent employed is simply an amount sufficient to produce a foam of the desired specific gravity and may range from about 0.1 to about 1 per cent of the weight of the solution. The hardening catalyst is an acid-reacting substance that causes the urea-formaldehyde condensation product to harden into an insoluble resin. Any organic or inorganic acid, acid salt or other acid substance, such as maleic acid, phosphoric acid or ammonium chloride, may be employed as the hardening catalyst. Unless the condensation of the urea-formaldehyde product has been advanced too far, the water remains in solution with the urea-formaldehyde condensation product until the foam has hardened into a rigid structure. The water evaporates upon exposure of the foam to the atmosphere.

After the solution has been foamed, the foam begins to collapse if it is allowed to stand. Thus it is necessary to use enough hardening catalyst so that the foam gels or hardens while it still has the desired low specific gravity. The amount of hardening catalyst used is an amount great enough to cause the foam to harden while it still has the desired low specific gravity, but not great enough to cause hardening to interfere with the foaming of the solution (i. e., an amount sufficient to impart to the foam a pH ranging from about 1 to about 5).

The speed at which the foam gels or hardens is also a function of the temperature of the surrounding atmosphere. However, since comparatively high temperatures (e. g. 130–160° F.) may cause the foam to collapse, it is usually preferable to use temperatures in the neighborhood of room temperature and to use the pH as the main control for the speed of gelation. After the foam has gelled to an appreciable extent, the temperature can be raised (e. g. to 130–160° F.) to accelerate the complete curing of the foam without any danger of collapsing the foam.

In the preparation of a foamable aqueous solution of a urea-formaldehyde condensation product, it usually is desirable to carry the condensation as far as it can be carried without precipitation. A suitable solution of a urea-formaldehyde condensation product may be prepared as follows: formaldehyde and urea in a molal ratio of 2:1 are gently refluxed in an aqueous solution that has been brought to pH 5–6 by addition of sodium hydroxide. After the refluxing has been continued long enough (about one hour)

to carry the condensation to the desired stage, the solution is neutralized. The resulting solution can be diluted moderately if desired without causing precipitation.

The proportions of urea and formaldehyde used in preparing the urea-formaldehyde condensation product may be varied, but a molal formaldehyde-urea ratio approximating 2:1 is preferred. A greater amount of formaldehyde, such as 2.5 mols of formaldehyde for each mol of urea, may be used, but such an excess of formaldehyde tends to produce a somewhat inferior product. If a smaller amount of formaldehyde, such as 1.5 mols of formaldehyde for each mol of urea, is employed, great care must be exercised to prevent the formation of a precipitate that would interfere with the production of the foam.

The foaming agent used may be selected from a great variety of well known foaming agents which are operable in a solution having an acid pH. The foaming agent may be any one that is not so alkaline as to interfere with the use of an acid catalyst to harden the urea-formaldehyde condensation product, such as a reaction product of an alkaline oxide with an aliphatic alcohol of high molecular weight (e. g., a polyethylene glycol ether of octodecyl alcohol or octodecenyl alcohol) or the sodium salt of N-methyl oleyl taurin. In the use of one of the foregoing foaming agents, which are substantially neutral or weakly acid, it is preferable to add a small amount of a hardening catalyst. On the other hand, a foaming agent that is sufficiently acid so that it serves as the hardening catalyst as well as the foaming agent, such as crude butylated naphthalene sulfonic acid, may be employed.

In the production of the foam, an aqueous solution of the foaming agent may be charged into the whipping apparatus, and whipped into a foam before the addition of the aqueous solution of the urea-formaldehyde condensation product.

The aqueous solution employed, for example, may be a 25 per cent solution of a condensation product containing about 5 per cent by weight of finely divided wood flour. Additional modifiers may be used as in any urea-formaldehyde composition.

The solution is whipped into a foam of the desired specific gravity and is allowed to harden in any desired shape to form a sheet, block or other body of hardened foam. Often it is convenient to extrude the foam from the whipping apparatus onto a moving conveyor to form a continuous sheet or block.

The proportion of hardening catalyst should be such that the foam hardens within about 15 minutes after the end of the whipping operation. Preferably the foam as soon as it is rigid is introduced into a drier and dried at a gradually rising temperature.

*Example 1*

A 44 per cent aqueous solution of a urea-formaldehyde condensation product is prepared as hereinbefore described from 2 mols of formaldehyde and 1 mol of urea. As the condensation continues, the degree of advancement of the condensation is determined from time to time by removing a sample of the solution, cooling it to 20° C. and gradually adding distilled water at the same temperature until cloudiness appears in the solution. The condensation is carried to the point at which the addition of 3.2 volumes of distilled water to 1 volume of the condensation solution is required to cause cloudiness to appear. In determining the amount of resin formed from given amounts of formaldehyde and urea, about 1 mol of water for each mol of urea is assumed to have been eliminated by condensation. After 50 grams of butylated naphthalene sulfonic acid have been dissolved in 10 pounds of water, the solution is whipped into a foam. Ten seconds after the whipping is begun, 150 grams of an 85 per cent aqueous solution of phosphoric acid are added, and the whipping is continued for an additional 60 seconds. A solution prepared by adding 24 pounds of water and 3 pounds of urea to 34 pounds of the 44 per cent aqueous solution of the condensation product is then added to the whipping apparatus while the whipping is continued. After an additional 2 minutes of whipping, the foam is extruded in a continuous layer on a conveyor belt. The foam is exposed to the atmosphere for about one hour, and it is then rigid enough to be handled so that it can be passed through a continuous drier in which the initial temperature is about 30° C. and the final temperature is about 60° C. The resulting hardened foam, with a specific gravity of .015, has a compressive strength of 5.6 pounds per square inch. A hardened foam produced by a procedure that is the same as the foregoing except that the urea is omitted has a compressive strength of 4.5 pounds per square inch, is more difficult to shape into a sheet or block than the foam produced in accordance with the foregoing procedure, and takes about 4 hours instead of 1 hour to become rigid enough to be handled.

*Example 2*

A hardened foam is produced by a procedure that is the same as the procedure of Example 1 except that 1.92 mols of formaldehyde are used for each mol of urea in preparing the condensation product and the condensation is continued until the addition of only 2.5 volumes of distilled water to 1 volume of the condensation solution is required to cause cloudiness to appear. The hardened foam so produced has a specific gravity of .015 and a compressive strength of 6.7 pounds per square inch.

*Example 3*

A hardened foam is produced by a procedure that is the same as the procedure of Example 2 except that the condensation is continued until the addition of only 1.75 volumes of distilled water to 1 volume of the condensation solution is required to cause cloudiness to appear. The hardened foam so produced has a specific gravity of .015 and a compressive strength of 7.8 pounds per square inch. If in the procedure of the present example the urea is omitted, the condensation product separates from the water so that the foam collapses immediately after the whipping operation before the foam can become rigid or gelled.

Various embodiments of the invention may be devised to meet various requirements.

This is a continuation-in-part of application Serial No. 545,008, filed July 14, 1944 now abandoned.

Having described the invention, I claim:

1. In a process of producing hardened foam by foaming an aqueous solution containing a urea-formaldehyde condensation product and an acid-reacting hardening agent, a method of increasing the compressive strength of the resulting hardened foam that comprises the steps of (1) incorporating free urea in the solution after formation of the urea-formaldehyde condensation product and (2) foaming the solution before the free urea has reacted with the urea-formaldehyde condensation product, the free urea being incorporated in an amount which is 5 to 60 per cent of the weight of the condensation product and is small enough so that the overall free and combined molal formaldehyde-urea ratio is not less than 1:1.

2. A hardened urea-formaldehyde resin foam of improved compressive strength produced by the process of claim 1.

3. A process as claimed in claim 1 wherein 1 part by weight of free urea is incorporated for every 5 parts by weight of the condensation product.

4. In a process of producing hardened foam by foaming an aqueous solution containing a urea-formaldehyde condensation product and an acid-reacting hardening agent, a method of increasing the compressive strength of the resulting hardened foam that comprises the steps of (1) incorporating free urea in the solution after formation of a condensation product having a formaldehyde-urea molal ratio of 2:1 and (2) foaming the solution before the free urea has reacted with the urea-formaldehyde condensation product, the free urea being incorporated in an amount which is 5 to 60 per cent of the weight of the condensation product and is small enough so that the overall free and combined molal formaldehyde-urea ratio is not less than 1:1.

5. A hardened urea-formaldehyde resin foam of improved compressive strength produced by the process of claim 4.

6. A process as claimed in claim 4 wherein 1 part by weight of free urea is incorporated for every 5 parts by weight of the condensation product.

7. In a process of producing hardened foam by foaming an aqueous solution containing a urea-formaldehyde condensation product and an acid-reacting hardening agent, a method of increasing the compressive strength of the resulting hardened foam that comprises the steps of (1) preparing the condensation product by condensing urea and formaldehyde to an advanced stage whereby there is obtained a water-soluble condensation product which precipitates when subjected to the foaming conditions, (2) incorporating free urea in the solution in an amount sufficient to prevent precipitation of the condensation product when subjected to the foaming conditions and (3) foaming the solution before the free urea has reacted with the urea-formaldehyde condensation product, so that the foam sets without precipitation of the condensation product.

LEONARD S. MEYER.

REFERENCES CITED

The following references are of record in the file of this patent:

UNITED STATES PATENTS

| Number | Name | Date |
|---|---|---|
| 2,076,295 | Curs et al. | Apr. 6, 1937 |
| 2,219,375 | Widmer et al. | Oct. 29, 1940 |
| 2,236,184 | Menger | Mar. 25, 1941 |
| 2,476,065 | Robinson | July 12, 1949 |